(12) United States Patent
Hofmann

(10) Patent No.: US 8,757,310 B2
(45) Date of Patent: Jun. 24, 2014

(54) MODULAR SYSTEM FOR A BATTERY

(75) Inventor: Juergen Hofmann, Korntal-Muenchingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 42 days.

(21) Appl. No.: 13/543,929

(22) Filed: Jul. 9, 2012

(65) Prior Publication Data

US 2013/0008731 A1 Jan. 10, 2013

(30) Foreign Application Priority Data

Jul. 7, 2011 (DE) .......................... 10 2011 051 627

(51) Int. Cl.
*B60S 5/06* (2006.01)
(52) U.S. Cl.
USPC ....................................................... 180/68.5
(58) Field of Classification Search
USPC ........... 180/68.5, 2.1; 903/907; 429/149, 151, 429/123, 129, 142
See application file for complete search history.

(56) References Cited

U.S. PATENT DOCUMENTS

| | | | |
|---|---|---|---|
| 5,495,159 A | 2/1996 | Shiraishi | |
| 5,523,666 A | 6/1996 | Hoelzl et al. | |
| 6,541,154 B2 * | 4/2003 | Oogami et al. | 429/159 |
| 8,025,118 B2 * | 9/2011 | Scheucher | 180/68.5 |
| 8,146,694 B2 * | 4/2012 | Hamidi | 180/68.5 |
| 2010/0039067 A1 | 2/2010 | Hill et al. | |
| 2011/0011662 A1 * | 1/2011 | Oriet et al. | 180/68.5 |
| 2011/0066515 A1 | 3/2011 | Horvath et al. | |
| 2011/0269008 A1 * | 11/2011 | Houchin-Miller et al. | 429/120 |

FOREIGN PATENT DOCUMENTS

| | | |
|---|---|---|
| CH | 688 598 | 11/1997 |
| DE | 43 44 563 | 12/1994 |
| DE | 10200800800 | 6/2009 |
| DE | 10 2009 001 080 | 8/2010 |
| GB | 2 185 866 | 7/1987 |
| JP | 2009119935 | 6/2009 |

* cited by examiner

*Primary Examiner* — John Walters
(74) *Attorney, Agent, or Firm* — Gerald E. Hespos; Michael J. Porco; Matthew T. Hespos

(57) ABSTRACT

A modular system (1) for a battery (2) has a battery housing (3), at least one first battery module (4) having a number n of battery cells (5) and at least one further battery module (6) having a higher number n+x or a lower number n−x of battery cells (5) can be arranged in the battery housing (3). In this case, one first battery module (4) can be arranged in a space-filling manner within the battery housing (3), or one further battery module (6) together with at least one compensation element (7) of the modular system (1) can be arranged in a space-filling manner within the battery housing (3).

15 Claims, 2 Drawing Sheets

MODULAR SYSTEM FOR A BATTERY

CROSS REFERENCE TO RELATED APPLICATION

This application claims priority under 35 USC 119 to German Patent Appl. No. 10 2011 051 627.1 filed on Jul. 7, 2011, the entire disclosure of which is incorporated herein by reference.

BACKGROUND OF THE INVENTION

1. Field of the Invention

The invention relates to a modular system for a battery, more particularly for a traction battery, of a motor vehicle. The invention also relates to a battery constructed according to this modular system.

2. Description of the Related Art

Batteries are electrical energy stores that are used in numerous applications and in many technical fields. In this case, the demand for, and the requirements made of, batteries are constantly increasing due to their use in hybrid vehicles and electric vehicles. A battery usually has a plurality of battery cells to store electrical energy or to supply a load with electricity. The battery cells generally have the same size and form and can be arranged within a battery module. Plural battery modules arranged within a battery housing are essential components of the battery. The battery cells can be connected in parallel or in series, with the battery being extended by electronic control circuits as necessary. The individual battery modules of a battery preferably completely fill the battery housing in the case of batteries for motor vehicles in view of static and safety engineering reasons. On the other hand, there are different requirements or concepts for designing such a battery. For example, attention should be drawn to the number of battery cells of a battery module, which is adapted as necessary to a series or parallel connection of the individual battery cells. For example, an even number of battery cells is more suitable than an odd number of battery cells for a battery module that has a parallel interconnection of the battery cells. On the other hand, increasing the number of battery cells by one further battery cell, may provide an odd number of battery cells, but leads to greater power of the battery, which is needed in specific requirements. Thus, there are different battery modules having different sizes and the different size of the battery modules leads to an adapted size of the battery housing. In this case, consideration should be given to ensuring that the battery modules are arranged in a space-filling manner within the battery housing for the safety engineering reasons mentioned above. The different sizes of the battery modules therefore lead to battery housings of correspondingly different sizes. However, battery housings of different sizes are uneconomic due to higher production costs and due to corresponding adaptation of their surroundings, particularly in the case of use in vehicles.

The invention relates to providing a battery with improved economic viability and increased safety.

SUMMARY OF THE INVENTION

The invention is based on the general concept of specifying a modular system for constructing a battery, more particularly a traction battery, with which different battery modules can be arranged in a space-filling manner in a battery housing that is always of the same size. A space not filled by the battery modules is closed by at least one compensation element. This leads to a high economic viability since only battery housings of a single size need be produced. At the same time, adaptation of receptacles in motor vehicles is obviated by virtue of the standardized battery housing. The modular system according to the invention for such a battery comprises a battery housing, a first battery module that can be arranged in the battery housing and has a number n of battery cells, and a further battery module having a higher number n+x or a lower number n−x of battery cells, and at least one compensation element. The first battery module having n battery cells therefore is smaller than a further battery module having a higher number of battery cells n+x, while the first battery module is larger than a further battery module having a lower number n−x of battery cells. In this case, the first battery module and the second battery module have different sizes and/or forms. The different size of the battery modules is given by a different number of preferably identically embodied battery cells arranged within the respective battery modules. However, differently embodied battery cells and/or different arrangements of battery cells within the battery modules, also are conceivable for the different size and/or form of the battery modules. The battery therefore has a battery housing, in which one first battery module or a plurality of first battery modules are arranged in a space-filling manner so that the empty space made available to these battery modules by the battery housing is filled entirely with the battery modules. Alternatively, one further battery module or a plurality of further battery modules together with at least one compensation element can be arranged in a space-filling manner in the battery housing. In this case, the empty space available to the further battery modules in the battery housing is not totally filled by the further battery modules. Hence, a space-filling arrangement is realized by employing at least one compensation element fills the remaining empty space of the battery housing. The space-filling arrangement ensures increased safety since remaining empty spaces within the battery housing, particularly in the case of use in motor vehicles and the actions of forces associated therewith, constitute a hazard. The modular system for the battery also makes it possible to arrange the different battery modules within structurally identical battery housings. Therefore, batteries comprising first or further battery modules have the same size and/or form enable a uniform design of the surroundings of the battery. The uniform design leads to the increased economic viability of battery production, reduced production costs of the associated surroundings and reduced production costs of a motor vehicle.

The at least one compensation element may have the size of a battery cell. This is advantageous particularly when all battery cells of the battery have the same size. Consequently, a remaining empty space within the battery housing has substantially the size of one battery cell or a plurality of battery cells. The remaining empty space then is filled with the compensation element or compensation elements so that the further battery modules together with the compensation element or elements are arranged in a space-filling manner within the battery housing. Additionally or alternatively, the compensation element may have the same form and size as the battery cell. Consequently, the economic viability is increased since only compensation elements having the same size and form are produced. However, embodiments also are conceivable in which the compensation element has any desired form and size such as a form and/or size of a plurality of battery cells arranged against one another.

The compensation element may have a fillable cavity. The cavity can be filled at least partly in accordance with the conditions or the requirements. In this case, the cavity is filled e.g. with a gas, such as air. Alternatively or additionally, the cavity can be filled with a liquid, such as water. A solid can also be arranged in the cavity. Embodiments are also conceivable in which a mixture of a gas, liquid and/or a solid is arranged in the cavity.

At least one compensation element may be a crash element or deformation element. The compensation element therefore functions to protect the battery or the battery modules and battery cells against external forces, such as forces caused by a crash when used in a vehicle. Thus, deformation of the compensation element ensures protection of the battery.

The compensation element may be resilient to increase the protection of the battery. Thus, the compensation element may deform in response to the action of the forces causing the deformation, but returns to the original form and/or size. Alternatively or additionally, the compensation element may have a spring device. The spring device preferably is arranged between the compensation element and the battery housing. Thus, impacts between the compensation element and the battery housing are prevented or at least reduced. The spring device or a further spring device can be arranged between the compensation element and at least one adjacent battery module. Thus, collisions between the compensation element and the adjacent battery module are avoided or reduced. In this case, the compensation element preferably is pre-stressed against the battery housing or against the battery module by the resilient embodiment and/or by the spring device.

The individual battery modules may be arranged parallel within the battery housing. Therefore, the corresponding sides of the battery modules preferably run parallel to one another and preferably are arranged against one another. In this case, the battery modules may have an elongate parallelepiped form. The long sides of the respective battery modules preferably are parallel to one another and the long sides of adjacent battery modules preferably are against one another. The battery housing also may have a parallelepiped form. Thus, a particularly simple mounting of the battery modules and, if appropriate, of the compensation elements is possible.

The first battery module may have thirteen battery cells, while the further battery module may have twelve battery cells, with the battery cells each having the same form and size. Therefore, the first battery module or a plurality of first battery modules can be arranged in a space-filling manner in the battery housing. A battery that exclusively has first battery modules does not require an additional compensation element in a space-filling manner within the battery housing. In contrast, the space-filling arrangement of the further battery module has at least one compensation element within the battery housing. In this case, the use of battery modules having twelve or thirteen battery cells corresponds to conventional practice in the case of traction batteries in hybrid or electric vehicles.

The individual battery cells of a battery can be connected electrically to one another in any desired manner. For example, the battery cells of a battery module may be connected in parallel or in series. In this case, the battery cells of different battery modules can have different electrical circuits. Hence, some battery modules may be connected in parallel, while others can be connected in series. Furthermore, one battery cell or a plurality of battery cells of one battery module can be connected electrically as desired to one battery cell or a plurality of battery cells of one or more other battery modules.

The invention also relates to a battery constructed according to the modular system and has at least one further battery module and at least one compensation element. The battery can have other components, such as electronic control circuits.

Further important features and advantages of the invention are evident from the claims, the drawings and the associated description.

The features mentioned above and those yet to be explained below can be used not only in the combination respectively indicated, but also in other combinations or by themselves, without departing from the scope of the present invention.

Preferred exemplary embodiments of the invention are illustrated in the drawings and are explained in greater detail in the description below, identical reference signs referring to identical or similar or functionally identical structural parts.

DETAILED DESCRIPTION OF THE PREFERRED EMBODIMENTS

Figure 1:
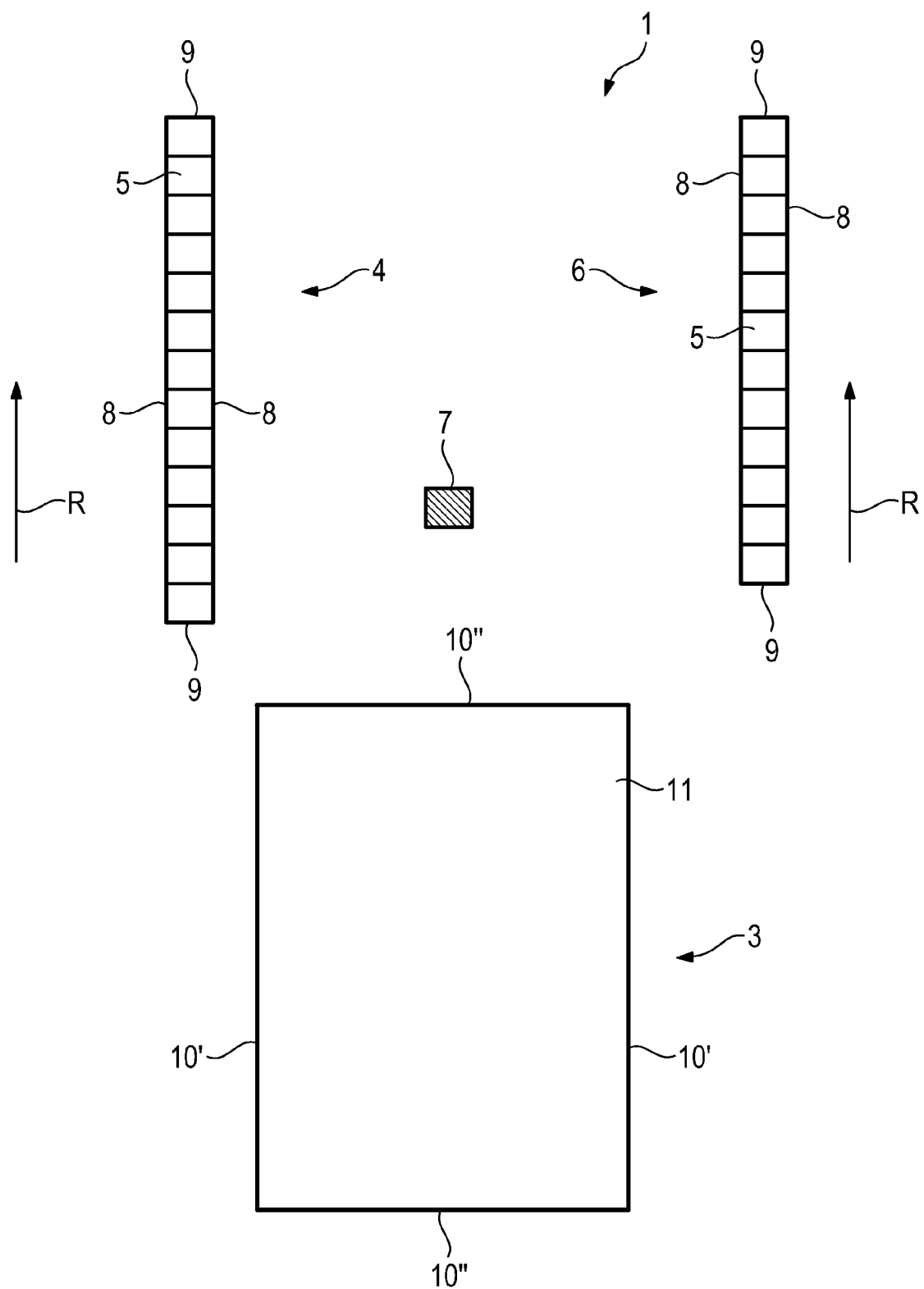
FIG. 1 shows a plan view of a modular system.
Figure 2:
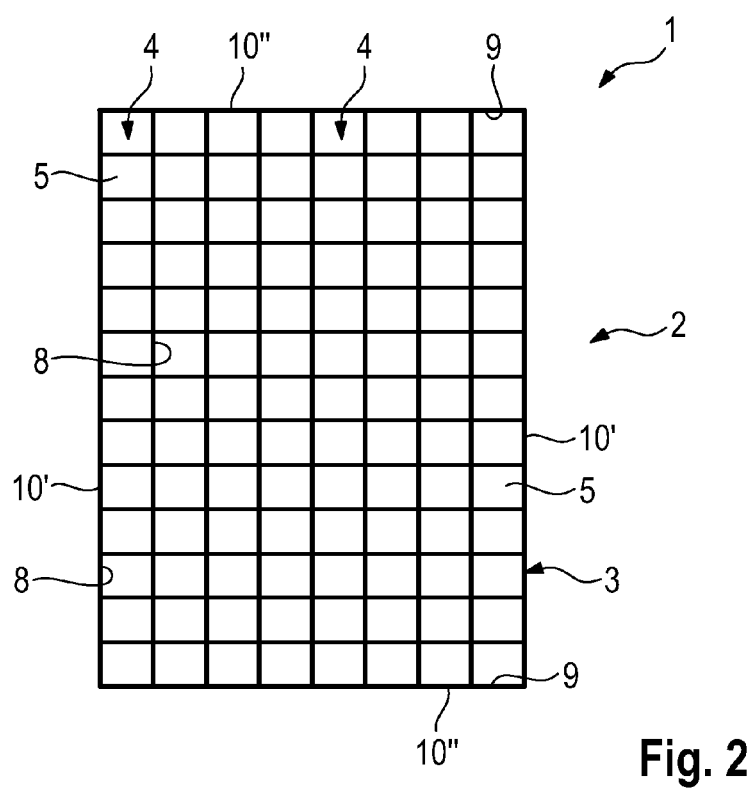
FIGS. 2 and 3 respectively show a plan view of two embodiments of batteries constructed according to the modular system.
Figure 3:
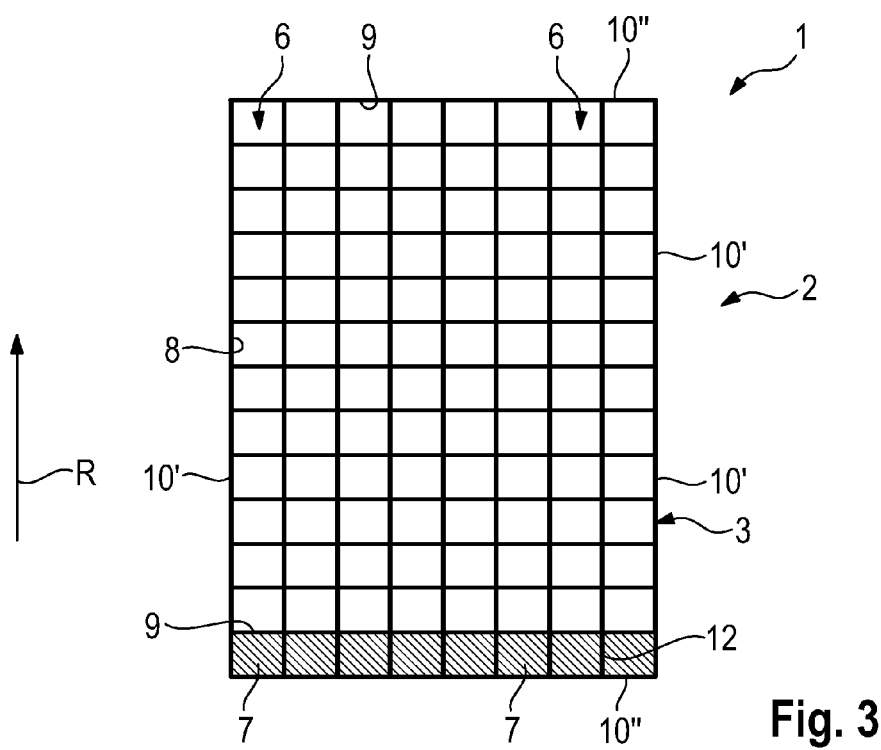

A modular system in accordance with the invention is identified by the numeral 1 in FIG. 1. The modular system 1 for a battery 2 comprises a battery housing 3, a first battery module 4, having a number n of battery cells 5. The first battery module 4 shown has a number of $$n=13$$

battery cells 5. The modular system 1 further comprises at least one further battery module 6 having a higher number n+1 or a lower number n−1 of battery cells 5. The further battery module 6 shown has a number of $$n=13-1=12$$

battery cells 5. The modular system 1 also has at least one compensation element 7, embodied as a deformation element. The battery cells 5 of the battery modules 4, 6 furthermore have the same parallelepiped form and the same size. The battery cells 5 are arranged against one another within the battery modules 4, 6 along a direction designated by R in such a way that the sides of the same size of adjacent battery cells 5 make contact with one another. Consequently, the respective battery modules 4, 6 have an elongate parallelepiped form. The battery modules 4, 6 therefore each have long sides 8 and short sides 9. By virtue of the identical size and form of the individual battery cells 5, the further battery element 6 is shorter along the long side 8 by the dimension of one battery cell 5 along the direction R. The compensation element 7 has the same size and form of such a battery cell 5. The battery housing 3 is a parallelepiped and has side walls 10', 10" that enclose an empty space 11. The opposite side walls 10' of the battery housing 3 shown in FIGS. 1-3 are longer than the other two opposite side walls 10". Moreover, the shorter sides 10" of the battery housing 3 have eight times the length of the short side 9 of one of the battery modules 4, 6. Furthermore, the battery modules 4, 6, the compensation element 7 and the empty space 11 of the battery housing 3 have the same dimension along a direction perpendicular to the plane of the drawing. The battery modules 4, 6, the compensation element 7 and the empty space 11 of the battery housing 3 therefore have an identical depth.

The battery modules 4, 6 and the compensation element 7 can be arranged within the battery housing 3. FIG. 2 shows one possible embodiment of a battery 2 constructed with the aid of the modular system 1. In this case, eight parallel first battery modules 4 fill the entire empty space 11 of the battery housing 3. The long sides 8 of the first battery modules 4 are parallel to the long side walls 10' of the battery housing 3 and the short sides 9 of the first battery modules 4 are parallel to the short side walls 10" of the battery housing 3. Moreover, the opposite long sides 8 of adjacent first battery modules 4 make contact with one another, while the short sides 9 of the first battery modules 4 make contact with the short side walls 10" of the battery housing 3. The first battery modules 4 therefore are arranged in a space-filling manner within the battery housing 3.

FIG. 3 shows a further embodiment of a battery 2 according to the modular system 1. In contrast to the battery 2 of FIG. 2, the battery 2 in FIG. 3 has eight further battery modules 6 that are arranged parallel. The long sides 8 of the further battery modules 6 are parallel to the long side walls 10' of the battery housing 3 and contact opposite long sides 8 of adjacent first battery modules 4. The adjacent short sides 9 of all further battery modules 6 are arranged against one of the short walls 10" of the battery housing 3. Thus, a remaining empty space 12 arises along the opposite short side wall 10" of the battery housing 3 and has the dimension of eight battery cells 5 arranged alongside one another perpendicular to the direction R. The arrangement of eight adjacent and correspondingly arranged compensation elements 7 within the remaining empty space 12 fills the empty space 11 of the battery housing 3. The eight further battery modules 6 and the eight compensation elements 7 therefore are arranged in a space-filling manner within the battery housing 3.

The modular system 1 according to the invention enables identical battery housings 3 to construct batteries with at least one first battery module 4 and batteries with at least one further battery module 6 and at least one compensation element 7.

What is claimed is:

1. A modular system for a traction battery of a motor vehicle, comprising:
    a battery housing;
    at least one first battery module that can be arranged in the battery housing and has a first number of battery cells to fill the battery housing;
    at least one further battery module that can be arranged in the battery housing and has a second number of battery cells that is less than the first number so that the second battery module does not fill the battery housing; and
    at least one compensation element that is not a battery cell and that can be arranged with the second battery module in the battery housing so that the at least one compensation element and the further battery module fill the battery housing.

2. The modular system of claim 1, wherein the compensation element has a size and form corresponding to a size and form of one of the battery cells.

3. The modular system of claim 2, wherein the compensation element has a fillable cavity that is at least partly filled with a gas, a liquid or a solid.

4. The modular system of claim 1, wherein the compensation element is a crash or deformation element.

5. The modular system of claim 1, wherein the compensation element is resilient.

6. The modular system of claim 1, wherein the battery modules are arranged parallel to one another within the battery housing.

7. The modular system of claim 1, wherein the first battery module has thirteen battery cells and the further battery module has twelve battery cells.

8. The modular system of claim 1, wherein the battery cells of the first battery module or of the further battery module are connected electrically in parallel or in series with one another.

9. The modular system of claim 1, wherein the battery cells of at least one of the battery modules have substantially identical forms and sizes.

10. A battery constructed according to a modular system of claim 1, comprising at least one further battery module and at least one compensation element.

11. A modular system of traction batteries of a motor vehicle, comprising:
    substantially identical rectangular battery housings, each of the housings having pairs of opposed side walls defining an empty space within the respective housing, the empty space having a length and a width;
    at least a first of the batteries of the modular system having a first rectangular array of battery cells disposed in the empty space with the battery cells arranged in a length direction defining a total length substantially equal to the length of the empty space in the housing and the battery cells arranged in a width direction defining a total width substantially equal to the width of the empty space in the housing so that the battery cells of the first battery substantially fill the empty space; and
    at least a second of the batteries of the modular system having a second rectangular array of the battery cells with at least one fewer of the battery cells being arranged in a length direction than the battery cells arranged in the length direction in the first battery and at least one resilient compensation element that is not a battery cell disposed in an empty space defined by the smaller number of battery cells of the second of the batteries, the compensation element being dimensioned so that a combined length of the battery cells and the compensation element substantially equals the length of the empty space in the housing and so that the battery cells and the compensation element of the second battery substantially fill the empty space.

12. The modular battery system of claim 11, wherein the compensation element is adjacent one of the walls of the housing.

13. The modular battery system of claim 11, wherein the compensation element and the battery cells are substantially rectangular.

14. The modular battery system of claim 11, the battery cells have substantially identical sizes and shapes.

15. The modular battery system of claim 14, wherein the compensation element comprises a plurality of compensation element components, each of the compensation element components having a size and shape substantially conforming to the size and shape of each of the battery cells.

* * * * *